June 27, 1967     G. W. ENT ETAL     3,327,884
HIGH PRESSURE AND HIGH TEMPERATURE VESSELS
Filed Feb. 7, 1964
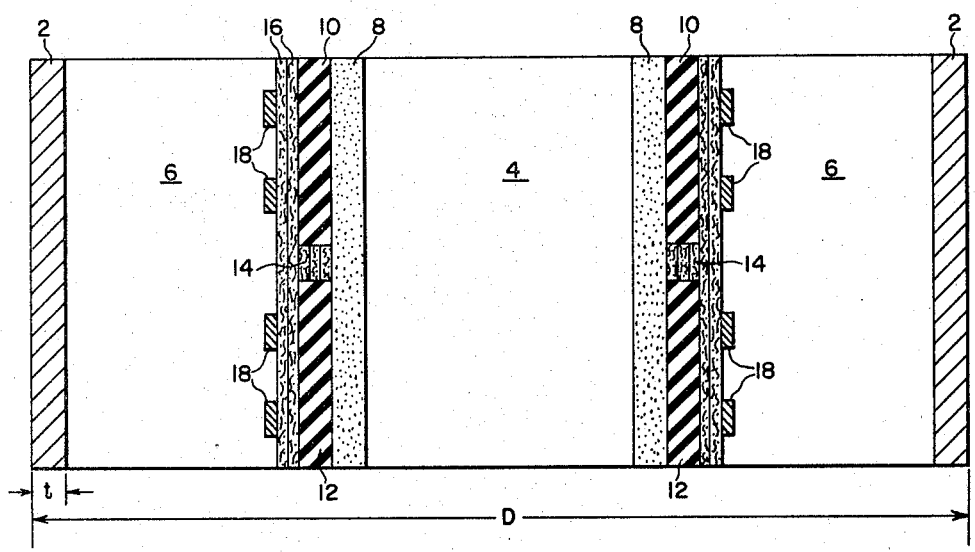
WITNESSES
Theodore F. Wrobel
James F. Young
INVENTORS
Girard W. Ent, William S. Davenport
and Jack Mc Donald
BY
A Somuell

United States Patent Office 3,327,884
Patented June 27, 1967

3,327,884
HIGH PRESSURE AND HIGH TEMPERATURE VESSELS
Girard W. Ent, Salem Township, William S. Davenport, Derry Township, and Jack McDonald, Penn Hills, Pa., assignors to Westinghouse Electric Corporation, Pittsburgh, Pa., a corporation of Pennsylvania
Filed Feb. 7, 1964, Ser. No. 343,370
3 Claims. (Cl. 220—9)

The present invention relates to fluid containing vessels, and more particularly to vessels for containing fluid at high temperatures and high pressures.

The best presently known thermal insulating material is lampblack. Because of the difficulty of handling lampblack, its applications as an insulating material in pressure vessels has been limited. This is especially true where the rapid discharge of fluid from a high pressure to a low pressure is desired. Improper encapsulation of lampblack if used would contaminate the fluid being discharged and thereby negate any advantages of its use. In order to provide the desired temperature and pressure if other types of insulating materials are used, a large quantity is necessary to meet the design requirements. By using a large quantity of insulating material, the overall size of the pressure vessel is increased as is the wall thickness of the vessel. The overall cost of the vessel is thus increased by requiring a large amount of insulating material, a larger vessel and thicker vessel walls.

It is therefore an object of the present invention to provide a new and improved pressure vessel utilizing lampblack as an insulating material.

It is a further object of the present invention to provide a new and improved pressure vessel utilizing lampblack which is so encapsulated to prohibit contamination during rapid pressure discharge.

It is a still further object of the present invention to provide a new and improved pressure vessel utilizing lampblack as an insulating material and thereby reducing the size of the vessel and decreasing its cost.

Broadly, the present invention provides a vessel for containing a fluid at high temperatures and pressures in which an outer vessel has disposed therein a layer of lampblack which is encapsulated between a susceptor layer and an insulating layer, so that, even at high temperatures and with rapid pressure discharges, the lampblack is secured therebetween as not to contaminate the fluid within the vessel.

These and other objects of the present invention will become more apparent when considered in view of the following specification and drawing in which:

The single figure is a sectional view showing the vessel of the present invention.

Referring now to the single figure, a vessel having a substantially cylindrical shape and being fabricated of steel, for instance, is shown in cross section. The vessel is designed to contain a fluid at predetermined pressures and temperatures. The vessel has an outer wall 2 with a wall thickness of $t$, the outside diameter of the vessel being D. The vessel is divided into a high temperature, inner chamber 4 and a lower temperature, outer chamber 6, disposed around the inner chamber 4. The internal pressure of the vessel may, for example, be 1200 p.s.i.g. The temperature of the inner chamber 4 may be 5,000° F., for example, while the temperature of the outer chamber 6 may be 600° F. at the wall 2. An induction coil may be provided in order to maintain the inner chamber temperature of fluid but none is shown herein for purposes of clarity.

The inner chamber 4 is formed by disposing concentrically to the cylindrical axis of the vessel a susceptor cylinder 8. The susceptor cylinder, for example, may comprise graphite or other suitable material. The susceptor cylinder 8 may be molded in a substantially cylindrical shape and disposed concentrically between the outer walls 2 of the vessel.

Over the susceptor cylinder 8 are slipped two cylindrical sections of lampblack 10 and 12. For fabrication, the lampblack sections 10 and 12 may be bonded together with a solvent containing 1 or 2% phenolic varnish. Once the vessel is in operation at high temperature and pressure, the varnish will evaporate providing a substantially pure lampblack layer around the susceptor layer 8. Only one cylindrical section of lampblack may be used of course. However, for purposes of strength, it may be advisable to use two or more sections in that it becomes difficult to cast very large cylindrical sections of lampblack.

In between the lampblack sections 10 and 12 and adjacent the susceptor layer 8 are placed several insulating layers which, for example, may comprise thin strips of graphite felt or other similar insulating material. Over these strips 14 and the lampblack sections 10 and 12 are placed additional strips 16 of the same insulating material, for example, thin strips of graphite felt, which are wrapped around the outside surface of the sections 10 and 12.

To encapsulate the lampblack sections 10 and 12 between the susceptor cylinder 8 and the layers of graphite felt, four steel bands 18 are placed around the entire structure and tightened to secure the lampblack material within the susceptor cylinder 8 and the graphite layers 14 and 16.

With the vessel in operation at a high temperature of example 5,000° F. within the inner chamber 4, the solvent containing the phenolic varnish dissolves and leaves the lampblack between the susceptor cylinder 8 and the graphite felt strips 14 and 16 in its characteristic sooty consistency. However, by depositing the lampblack between the susceptor layer 8 and the graphite felt strips 14 and 16, even if the high temperature gas is expelled from the vessel to a low pressure in a short period of time, very little contamination from the lampblack can occur because of its secure encapsulation.

By the design of the described embodiment, it can be seen that a substantial cost reduction can be effected. Since lampblack is the best known thermal insulation, a thinner thickness of insulating material can be used. A cost reduction therefore results from requiring less insulating material to maintain the desired inner temperature of the fluid. But perhaps more important is the overall reduction of the size of the vessel, which is usually an expensive steel structure. According to design standards, a certain outside diameter of vessel must be provided to maintain a fluid at a given temperature and pressure at the outside wall of the vessel. If this temperature can be substantially reduced by the use of a very good insulating material such as lampblack, the overall diameter of the vessel can be reduced. Since as the diameter of the vessel is decreased, the amount of force on the outside wall of the vessel is also decreased, the wall thickness of the vessel may be also reduced and still meet the design requirements. Therefore, by the reduction of the outside diameter, which results from the use of a smaller thickness of insulating material, lampblack, the outside diameter of the vessel and the wall thickness of the vessel may be reduced with substantial savings in cost.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. A vessel for containing a fluid at high temperatures and pressures comprising, an outer shell having a substantially cylindrical shape and a wall thickness to maintain the design strength for given temperatures and pressures, an inner structure forming a chamber within said outer shell to contain the fluid at a given temperature and pressure, said inner structure including an inner layer having a substantially cylindrical shape and comprising a thermally conductive material being disposed adjacent the high temperature region of said vessel, a primary insulator layer comprising lampblack and being disposed adjacent to said inner layer, a plurality of secondary insulator layers comprising a thermally insulating graphite felt material being disposed around said primary insulator layer, and a plurality of banding straps disposed around said plurality of secondary insulator layers to secure said lampblack of said primary insulator layer between said inner and secondary layers so that the fluid within said vessel is not contaminated by the lampblack.

2. A vessel for containing a fluid at high temperatures and pressures comprising, an outer shell having a wall thickness sufficient to maintain the design strength for given temperatures and pressures, an inner structure forming a chamber within said outer shell to contain the fluid at a given temperature and pressure, said inner structure including a thermal susceptor layer comprising a graphite material being disposed adjacent the high temperature region of said vessel, a primary insulator layer comprising lampblack being disposed adjacent to said susceptor layer, a plurality of secondary thermal insulator layers comprising a graphite felt material being disposed adjacent said primary insulator layer, and a plurality of banding straps disposed around said plurality of secondary insulator layers to secure said lampblack of said primary insulator layer between said susceptor and secondary layers so that fluid within said vessel is not contaminated by the lampblack.

3. A vessel for containing a fluid at high temperatures and pressures comprising, an outer shell having a substantially cylindrical shape and a wall thickness sufficient to maintain the design strength for given temperatures and pressures, an inner structure forming a chamber within said outer shell to contain the fluid at a given temperature and pressure, said structure including a thermal susceptor layer having a substantially cylindrical shape and comprising a graphite material being disposed adjacent the high temperature region of said vessel, a plurality of primary insulator sections comprising lampblack and being disposed around and adjacent to said susceptor layer, a plurality of secondary thermal insulator layers comprising a graphite felt material being disposed around and between said plurality of primary insulator sections, and a plurality of banding straps disposed around said plurality of secondary insulator layers to secure said lampblack of said plurality of primary insulator sections between said susceptor and secondary layers so that the fluid within said vessel is not contaminated by the lampblack.

References Cited

UNITED STATES PATENTS

| | | | |
|---|---|---|---|
| 1,251,830 | 1/1918 | Siegfried | 220—9 |
| 1,730,153 | 10/1929 | Lindsay | 220—9 |
| 1,963,481 | 6/1934 | Wilcox | 13—35 X |
| 3,009,600 | 11/1961 | Matsch | 220—9 |
| 3,131,920 | 5/1964 | Reinker et al. | 263—48 |
| 3,167,204 | 1/1965 | Rause | 220—3 X |
| 3,227,431 | 1/1966 | Steeves | 263—48 |

THERON E. CONDON, *Primary Examiner.*

JAMES R. GARRETT, *Examiner.*